(12) United States Patent
Baccarin et al.

(10) Patent No.: US 9,713,220 B2
(45) Date of Patent: Jul. 18, 2017

(54) AUTOMOTIVE LAMP COMPRISING A LED LIGHTING DEVICE

(71) Applicant: Automotive Lighting Italia S.p.A., Venaria Reale (IT)

(72) Inventors: Davide Baccarin, Venaria Reale (IT); Federico Iannacone, Venaria Reale (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 0 days.

(21) Appl. No.: 15/030,307

(22) PCT Filed: Oct. 24, 2014

(86) PCT No.: PCT/IB2014/065595
§ 371 (c)(1),
(2) Date: Apr. 18, 2016

(87) PCT Pub. No.: WO2015/059675
PCT Pub. Date: Apr. 30, 2015

(65) Prior Publication Data
US 2016/0242254 A1 Aug. 18, 2016

(30) Foreign Application Priority Data
Oct. 24, 2013 (IT) .............................. TV2013A0177

(51) Int. Cl.
*G05F 1/00* (2006.01)
*H05B 37/02* (2006.01)
(Continued)

(52) U.S. Cl.
CPC ....... *H05B 33/0854* (2013.01); *B60Q 1/0094* (2013.01); *B60Q 1/1415* (2013.01);
(Continued)

(58) Field of Classification Search
None
See application file for complete search history.

(56) References Cited

U.S. PATENT DOCUMENTS 7,812,553 B2 * 10/2010 Kang ................. H05B 33/0818
315/224
8,198,834 B2 * 6/2012 Maruyama ......... H05B 33/0812
315/112
(Continued)

FOREIGN PATENT DOCUMENTS

EP 2584250 4/2013

OTHER PUBLICATIONS

Italian Search Report for Italian Patent Application No. TV20130177 dated Sep. 15, 2014.
(Continued)

*Primary Examiner* — Anh Tran
(74) *Attorney, Agent, or Firm* — McCartrer & English, LLP

(57) ABSTRACT

An automotive lamp with a lighting device is provided that includes a LED lighting circuit designed to generate a luminous flux on the basis of a driving current, a controlling electrical circuit which provides the driving current on the basis of a reference electrical quantity and of a sensed electrical quantity, and a compensating electrical circuit, which is configured so as to vary the reference electrical quantity by way of a compensation function of the luminous flux predetermined, on the basis of the temperature of the LED lighting circuit. The compensating electrical circuit includes a resistive conditioning electrical device that conditions the compensation function of the luminous flux so as to vary the reference electrical quantity in a predetermined way in response to a change in temperature.

13 Claims, 6 Drawing Sheets

(51) Int. Cl.
*H05B 39/04* (2006.01)
*H05B 41/36* (2006.01)
*H05B 33/08* (2006.01)
*F21S 8/10* (2006.01)
*B60Q 11/00* (2006.01)
*B60Q 1/00* (2006.01)
*B60Q 1/14* (2006.01)
*B60Q 1/34* (2006.01)
*B60Q 1/44* (2006.01)
*B60Q 1/48* (2006.01)

(52) U.S. Cl.
CPC ............... *B60Q 1/34* (2013.01); *B60Q 1/44* (2013.01); *B60Q 1/486* (2013.01); *B60Q 11/005* (2013.01); *F21S 48/115* (2013.01); *F21S 48/215* (2013.01); *H05B 33/0827* (2013.01); *H05B 33/0845* (2013.01)

(56) References Cited

U.S. PATENT DOCUMENTS

2002/0130786 A1    9/2002  Weindorf
2004/0217712 A1*  11/2004  Takeda ............... H05B 33/0848
                                                   315/82

OTHER PUBLICATIONS

PCT International Search Report and Written Opinion for PCT/IB2014/065595 dated Apr. 2, 2015.

* cited by examiner

AUTOMOTIVE LAMP COMPRISING A LED LIGHTING DEVICE

TECHNICAL FIELD

The present invention relates to a automotive lamp.

In particular, the present invention relates to a automotive lamp comprising a LED lighting device (acronym for Light Emitting Diode) comprising, in turn, one or more LEDs connected in series and/or in parallel to each other, and a LEDs electrical/electronic control device, which is designed to control the driving current supplied to the LEDs so as to compensate for the luminous flux decay caused by the temperature change that the LEDs undergo during operation.

BACKGROUND ART

More in detail, the present invention relates to a front or rear lamp for automobiles or motorcycles or similar motor vehicles, of the type comprising: a rear cup-shaped casing, being structured so as to be recessed inside of a compartment obtained in the vehicle body; a front lenticular body made from at least partially transparent or translucent materials and coupled to the rear casing in correspondence of the opening of the same so as to emerge from the vehicle body; and a LED lighting device that is designed to be housed inside the rear casing and comprises, in turn, one or more LED lighting circuits each provided with one or more LEDs arranged substantially facing the front lenticular body so as to perform an automotive lighting and/or signaling function, and an electronic control circuit having the purpose of controlling/adjusting the driving current which crosses the LEDs during operation thereof.

Some of the LED lighting devices described above are configured so as to supply a preset constant driving current to the LEDs. The driving current is determined during the lamp design step, and is dimensioned to allow, when in use, following the pre-heating, i.e. when the LEDs operate in the steady state condition, the light beam generated by the same to have a predetermined value. In particular, the driving current for supplying the LEDs is typically determined by a table of luminous/current flux contained in the LED datasheets provided by the LED manufacturers, on the basis of the luminous flux to be generated in a steady state condition.

It is known, however, that the luminous flux generated by a LED is not constant, but varies as a function of the junction temperature of the LED itself. In fact, the luminous flux generated by a LED is subject to a reduction/decay with increasing temperature of the LED itself. FIG. 1 illustrates an example of a graph showing the pattern of a LED luminous flux (shown in a normalized datasheet with respect to a temperature of 25° C.) supply by a constant rated current (400 mA) in response to temperature variation (in the temperature range comprised between −40° C. and 120° C.) in which the progressive linear reduction of the luminous flux with increasing temperature becomes evident. Some lighting devices have been implemented comprising electronic control circuits that provide the LEDs with a supply current determined on the basis of the required flux in the steady state condition associated with the achievement of a steady state condition associated with the attainment of a temperature typically within about 23° C. and 85° C. at the LED welding point or solder points.

However, said supply current can be over-dimensioned beyond the above mentioned temperature range. In fact, the electronic control circuits providing the LEDs with the supply current thus calculated have the technical problem of getting the LEDs to generate, in the preheating/initial ignition step, i.e. at temperatures relatively lower than the steady state temperature, a luminous flux that may be excessive. As shown in FIG. 1, at low temperature a LED supplied with the nominal driving current generates a high luminous flux as it is not yet considerably subjected to the luminous decay phenomenon. Obviously, supplying the LED with a driving current in the pre-heating step a resulting increase of the luminous flux is determined, the value of which, however, may be unacceptable in certain types of lamps, such as for example anti-fog lamps, as exceeding the maximum brightness thresholds set by the legal regulations governing the operation of said lamps. Obviously, this technical problem manifests itself in a particularly relevant way especially during the winter seasons and/or when the lamp operates in cold climates wherein the environment temperature can reach extremely low values, for example −40° C.

Therefore the need to obtain a lamp the flux of which is kept constant in response to change in the temperature has arisen. In particular, on the part of lamp manufacturers the need has arisen to provide a automotive lamp that is, on the one hand, suited to compensate for the luminous flux decay in a temperatures range comprised around a predetermined steady state temperature, higher than the LED preheating temperature and on the other hand, suited to attenuate in a controlled manner the luminous flux itself during the pre-heating step so as to keep it below tolerance thresholds according to the regulations, even when the outdoor environment operating temperature of the LED is relatively low.

EP 2 355 621 A2 describes a power supply circuit of a LED lamp structured to achieve energy savings during the LED pre-heating/lighting up step. The power supply circuit is essentially configured so as to control/adjust the current supplied to the LED according to a predetermined fixed linear function, which indicates the pattern of the current to be supplied to the LED as a function of the LED temperature. The linear function is represented graphically in EP 2 355 621 A2 by way of two rectilinear contiguous sections indicating the pattern of the current to be supplied to the LEDs in response to change in the temperature. When the LED temperature is lower than the steady state temperature, the power supply circuit increases in a linear way the current supplied to the LED on the basis of a temperature increase following the first rectilinear inclined section until reaching a predetermined current at the steady state temperature, while when the LED temperature exceeds the steady state temperature, the power supply circuit keeps the current constant as determined in the second horizontal section of the linear function.

DISCLOSURE OF INVENTION

Purpose of the present invention is to provide an automotive lamp comprising a lighting device that is, on the one hand, simple and unexpensive to produce and on the other, allows to perform a compensation of the luminous flux enhanced/improved with respect to the solution described in EP 2 355 621 A2.

This object is achieved by the present invention in that it relates to an automotive lamp comprising a lighting device, as defined in the appended claims.

BRIEF DESCRIPTION OF THE DRAWINGS

The present invention will now be described with reference to the accompanying drawings, which illustrate an example of a non-limiting embodiment, wherein:

FIG. 10 is a graph where the temporal pattern of the light flux decay compensated by means of the LED lighting device according to the present invention is compared with the temporal pattern of the non-compensated luminous flux decay; while

BEST MODE FOR CARRYING OUT THE INVENTION

The present invention will now be described in detail with reference to the accompanying drawings to enable a skilled person to manufacture and use it. Various modifications to the embodiments described above will be immediately apparent to the expert and the generic principles described can be applied to other embodiments and applications without departing from the scope of the present invention, as defined in the appended claims. Therefore, the present invention should not be considered as limited to the embodiments described and illustrated, but it should grant the wider protective scope consistent with the principles and features described and claimed herein.

Figure 1:
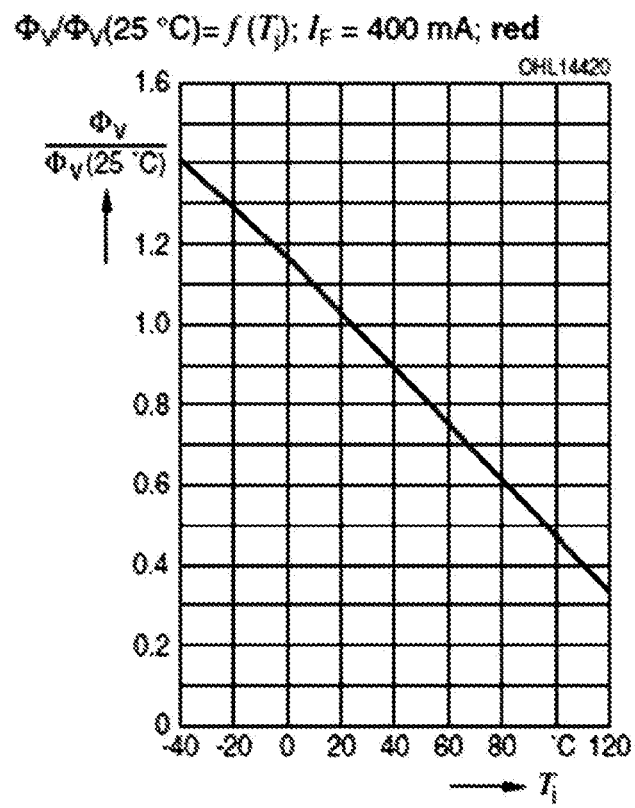
FIG. 1 shows a datasheet indicating an example of the luminous flux pattern generated by a LED as temperature changes, in a condition in which the LED is supplied with a predetermined constant current.
Figure 2:
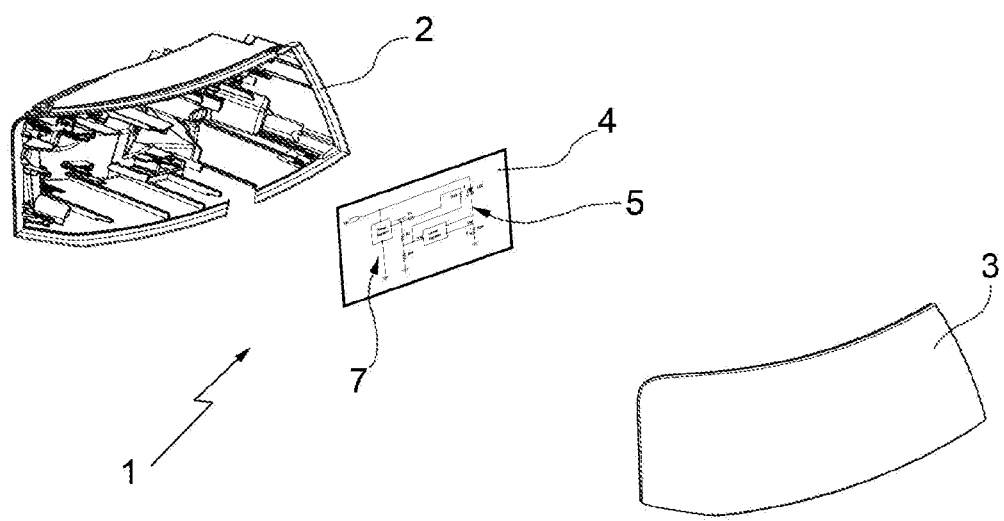
FIG. 2 shows schematically an exploded view of an automotive lamp according to the teachings of the present invention.

With reference to FIG. 2, with the number 1 an exploded view of an automotive lamp is shown schematically as a whole, according to a possible embodiment by way of example, wherein the automotive lamp 1 comprises a rear casing 2 preferably, but not necessarily, cup-shaped, which is structured so as to be preferably, but not necessarily, recessed inside a compartment in the vehicle body (not shown); a front lenticular body 3 made at least partially of transparent or translucent materials and structured so as to be coupled to the rear casing 2 in correspondence of the opening of the same so as to emerge preferably from the vehicle body (not shown); and a lighting device 4, schematically represented in FIG. 2 by an electronic card, which is designed to be housed substantially within the rear casing 2 and is provided, in turn, with a LED lighting circuit 5 preferably arranged facing the front lenticular body 3 so as to perform a lighting function and/or any automotive light signaling provided outside of the motor vehicle (not shown). In this regard, it is appropriate to specify that in the following the term "automotive lamp" will denote: a headlight, or a tail-light, or a parking light, or a direction indicator, or a stop light, or a fog light, or a reverse light, or a low beam light, or a bright light and any other type of lamp that can be installed in a similar motor vehicle, preferably an automotive vehicle.

Figure 3:
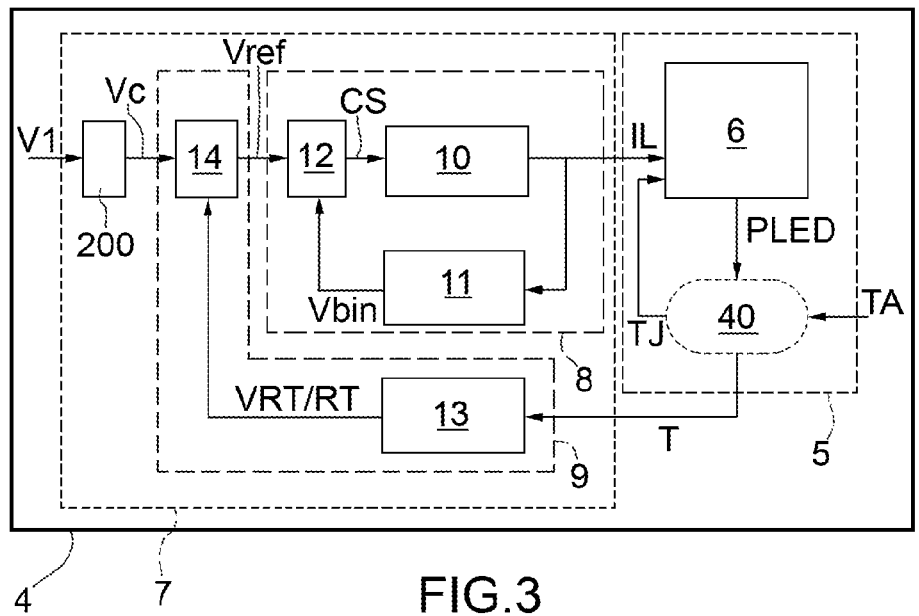
FIG. 3 is a block diagram of the LED lighting device comprised in the automotive lamp shown in FIG. 2.
Figure 4:
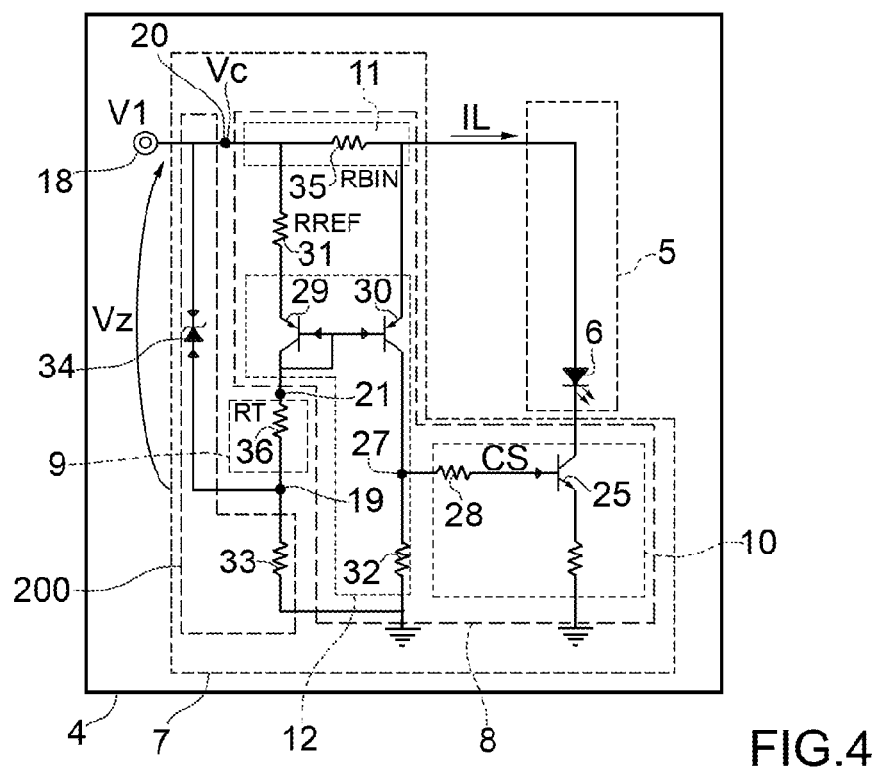
FIG. 4 is an electrical circuit of the LED lighting device shown in FIG. 3, according to a first embodiment.

With reference to FIGS. 2, 3 and 4, the LED lighting circuit 5 may comprise a LED 6, or a plurality of LEDs 6 connected together in series and/or in parallel according to any circuit configuration so as to form, for example, an array of LEDs and/or a matrix of LEDs.

FIG. 3 shows a functional block diagram of the lighting device 4 comprised in the automotive lamp 1 shown in FIG. 2 according to a possible embodiment.

Preferably, the lighting device 4 comprises: the lighting circuit 5 which is provided with at least one LED 6 and has a terminal receiving the driving current IL of the LED 6; and a power supply circuit 7 designed for supplying the driving current IL to the terminal of the lighting circuit 5.

According to an embodiment, by way of example, the power supply circuit 7 comprises a current controlling circuit 8, which has: a terminal receiving a reference electrical quantity that varies in a controlled manner on the basis of the temperature of the LED 6, preferably on the basis of the temperature T of the LED 6 connection, in the manner described in detail below, and a terminal connected to the terminal of the lighting circuit 5 to provide the latter with a driving signal IL that, in the illustrated example and in the following description corresponds, without thereby losing generality, to the driving current IL.

According to a possible embodiment, by way of example, the power supply circuit 7 further comprises a circuit to compensate for the luminous decay 9 of the LED 6, which is designed to provide by means of a compensation function Vref (T) a reference electrical quantity on the basis of the temperature T of the LED 6. As will be described in detail hereinafter the compensation function Vref (T) is used by the power supply circuit 7 for controlling the LED 6 so as to cause the luminous flux generated by the LED to vary in a predetermined way in response to the change in temperature, that is, according to a predetermined pattern.

In the illustrated example, the circuit for compensating the luminous decay 9 of the LED 6 has a terminal designed to receive a primary electrical power supply, and a terminal connected to the terminal of the current controlling circuit 8 to provide the same with the reference electrical quantity.

For reasons of clarity, in the following description explicit reference will be made, but without thereby losing in generality, to a reference electrical quantity corresponding to a reference electrical quantity Vref and to a primary power supply electrical quantity corresponding to a primary power supply voltage V1. According to an embodiment, the primary power supply voltage V1 may preferably be between about from 7 to 18 volts and be supplied by the power supply units of the motor vehicle, not shown.

It should however be pointed out that the present invention is not limited to the generation/use/conditioning of electrical quantities corresponding only to electrical voltages, but may provide in addition or alternatively the use/generation of other electrical quantities such as electrical currents.

According to a possible embodiment shown in FIG. 3, the current controlling circuit 8 comprises: a driving stage 10 designed to regulate/adjust the driving current IL supplied to the LED 6 based on a control signal CS; one current sensing stage 11 that provides a sensed electrical quantity that depends on the driving current IL, preferably a sensed voltage Vbin; and a current controlling stage 12 configured so as to: receive the sensed voltage Vbin, receive the reference voltage Vref, and provide the driving stage 10 with the control signal CS based on the reference electrical quantity Vref and on the sensed voltage Vbin.

The operation of the current controlling circuit 8 and of the luminous decay compensating circuit 9 corresponds substantially to the operation of a current internal control loop and, respectively, of a voltage external control loop, wherein the voltage external control loop 9 varies the reference voltage Vref based on the temperature T of the LED 6 by means of the predetermined compensation function Vref (T), while the current internal loop 8 controls the driving current IL preferably based on the difference between the reference voltage Vref and the sensed voltage Vbin. In particular, the current internal loop 8 generates the driving current IL substantially following the reference electrical quantity Vref which in turn is varied from moment to moment by the voltage external control loop by way of the compensation function Vref (T) on the basis of the temperature T of the LED 6. In other words, in the above circuit architecture with dual control loop, the reference electrical quantity Vref is set by means of the compensation function Vref (T) associated with the required luminous flux, while the driving current IL is adjusted/controlled according to the reference electrical quantity Vref so as to continuously follow the same in response to change in the temperature T. More in detail, by means of the compensation function Vref (T) the reference electrical quantity Vref supplied to the current internal control loop is set, so that as the temperature T varies the driving current IL of the LED 6 is such that it generates a luminous flux whose pattern in response to changes in the temperature T must correspond to the pattern of the predetermined flux.

According to the embodiment illustrated in FIG. 3, the luminous decay compensating circuit 9 comprises a temperature dependent electrical sensing stage 13, which can be locally thermally associated/coupled to the LED 6. The temperature dependent electrical sensing stage 13 is configured so as generate an electrical quantity VRT/RT, which is indicative from the temperature T of the LED 6, preferably of the junction and/or of the solder point of the LED 6.

According to an embodiment, the temperature dependent electrical sensing stage 13 may comprise a thermistor 15 (shown in detail in FIGS. 5 and 6), such as for example a NTC (Negative Temperature Coefficient) thermistor or a PTC (Positive Temperature Coefficient) thermistor. Regarding the electrical quantity VRT/RT, it may depend on the electrical resistance of the thermistor 15, or on the voltage drop VRT in the terminals of the same.

According to the embodiment illustrated in FIG. 3, the luminous decay compensating circuit 9 also comprises a resistive conditioning stage 14, which is configured so as to condition the compensation function of the luminous flux Vref (T) in a predetermined way, so that the reference electrical quantity Vref obtained by the conditioned compensation function of the luminous flux Vref (T), varies in a predetermined way in response to the change in the temperature T of the LED 6.

As will be described in detail below, the resistive conditioning stage 14 is provided with two resistors connected together and to the thermistor 15 (shown in FIGS. 5 and 6) in the manner described in detail hereinafter. The compensation function Vref (T) depends on, or rather is suitably conditioned by, the resistances of the two resistors of the resistive conditioning circuit 14. The Applicant has found that by suitably adjusting the resistances of the two resistors of the resistive conditioning circuit 14 it is possible to characterize/condition the compensation function of the luminous decay Vref (T) so that, in use, the luminous flux generated by the LED follows the pattern/curve of the predetermined luminous flux.

According to a possible embodiment, the resistive conditioning stage 14 is configured so as to: receive a voltage Vc which may be preferably constant, and can be provided preferably, but not necessarily, by a voltage regulator block 200 of known type, receiving in turn as input the primary supply voltage V1.

According to a possible embodiment, the resistive conditioning stage 14 is further configured so as to: receive from the electrical stage depending on the temperature 13, the electrical quantity VRT/RT indicative of the temperature T of the LED 6, determine the reference voltage Vref by means of the compensation function Vref (T) on the basis of the electrical quantity VRT/RT indicative of the temperature T, and provide the reference voltage Vref to the current controlling circuit 8.

In FIG. 3 is further provided a block 40 which essentially represents the thermal behavior of the system, in particular of the temperature to which both the LED junction 6 and the thermistor 15 are subjected. In the block 40 are in fact represented: the junction temperature Tj of the LED 6, the environment temperature TA and the temperature T to which the thermistor 15 is subjected during heating of the LED 6. It should be noted that the thermistor 15 can be arranged at the welding point, indicated below with solder points of the LED 6 to the respective circuit board (not shown). Accordingly: the temperature T of the thermistor 15 can be considered substantially equivalent to the temperature of the solder points Ts which in turn can be determined by the following equation:

$$Ts = Tj - R_{th\text{-}js} * PLED$$

wherein $R_{th\text{-}js}$ is the thermal resistance between junction and solder points while PLED is the electrical power of the LED.

The electrical circuit shown in FIG. 4 shows a possible advantageous embodiment of the circuit of the lighting device 4 shown in FIG. 3, in which the LED lighting circuit 5 and the power supply circuit 7 are indicated with dotted lines, while the voltage regulator block 200, the current controlling circuit 8 and the compensating circuit 9 are represented with dashed lines.

According to an embodiment by way of example shown in FIG. 4, the voltage regulator block 200 has a first terminal 18 receiving the primary supply voltage V1, a second terminal connected to a common node 20 with which the voltage Vc is provided, a third terminal connected to a common node 19 and a fourth terminal set at a reference potential, for example a ground potential, while the compensating circuit of the luminous flux decay 9 has a first terminal connected to the common node 19 and a second terminal connected to a common node 21.

The current controlling circuit 8 instead has a first terminal connected to the common node 20, a second terminal connected to the common node 21, a third terminal connected to the terminal set at a reference potential, and a fourth terminal and the fifth terminal connected to a first and respectively to a second terminal of the lighting circuit 5, (which in the figure illustrated by way of example comprises a LED 6) to provide the same with the driving current IL.

According to a possible embodiment shown in FIG. 4, the driving stage 10 comprises a driving transistor 25 connected to the lighting circuit 5 to adjust the driving current IL crossing the LED 6 on the basis of the control signal CS. According to a possible embodiment by way of example shown in FIG. 4, the driving transistor 25 can be a bipolar junction transistor preferably, but not necessarily of the NPN type, which has the collector connected to the LED 6 by means of the second terminal circuit 5, the emitter connected to a terminal set at a reference potential, for example a ground potential by means of a resistor 26, and the base connected to a common node 27 by means of a resistor 28 to receive the control signal CS.

According to a possible embodiment by way of example shown in FIG. 4, the current controlling stage 12 comprises a pair of transistors 29 and 30 connected together according to a mirror current configuration. In the example shown in FIG. 4, a first transistor 29 of the current controlling stage 12 is a bipolar junction transistor preferably, but not necessarily of the PNP type, and has: the collector connected to the common node 21, the emitter connected to common node 20 by means of a resistor 31 having a reference resistance Rref, and the base connected to the base of the second transistor 30 and to the collector of the first transistor 29 itself. In use, the resistor 31 is crossed by a reference current Iref that generates the reference electrical quantity Vref (voltage drop) across the resistor 31 itself.

According to a possible embodiment, by way of example, shown in FIG. 4, the second transistor 30 can be a bipolar junction transistor preferably, but not necessarily of the PNP type, which has its emitter connected to the fourth terminal of the current control circuit 8, and the collector connected to a ground line preferably arranged to a ground potential through a resistor 32. In particular, in the example illustrated in FIG. 4, a terminal of the resistor 32 is connected to the emitter of the transistor 30 by means of the common node 27 through which the control signal CS is supplied to the base of the transistor 25.

According to a possible embodiment shown in FIG. 4, the stage current sensor 11 comprises a resistor 33 having a detection resistance Rbin which has a terminal connected to the common node 20 and a terminal connected to the emitter of the transistor 30 and to the first terminal of the lighting circuit 5. In use, the resistor 33 is substantially crossed by the driving current IL that generates, across the resistor 33, the sensed voltage Vbin obviously having a value proportional to the driving current IL itself.

From the above description it should be specified that the current controlling circuit 8 acts as a current mirror which, being known per se, will not be described in detail except to point out that it is suited to provide the driving current IL on the basis of the following relation:

$$IL=(Rref/Rbin)*Iref=K*Iref \qquad a)$$

In particular, in the current controlling circuit 8 applies the relation $$(Iref*Rref)+Veb(T29)=(IL*Rbin)+Veb(T30) \qquad b)$$

wherein Veb (T29) is the base-emitter voltage of the first transistor 29, and Veb (T30) is the base-emitter voltage of the second transistor 30. Since the emitter current of the transistor 30 is negligible when compared with the driving current IL, and since the transistors T29 and T30 are substantially identical and in use are polarised in the same way in the active zone, it follows that (Vbe(T29))=Vbe (T30)). From the relation b) the approximate relation a) indicating a direct proportion between the driving current IL and the reference current Iref crossing the resistor 31 are then found.

The current controlling stage 12 is designed, in addition, to provide the control signal CS based on the difference between the driving current IL traversing the resistor 30 and the reference current Iref traversing the resistor 31 multiplied by K, so that the driving stage 10 increases or reduces the driving current IL traversing the LED 6 on the basis of the difference itself.

According to a possible embodiment shown in FIG. 4, the voltage regulator block 200 comprises a Zener diode 34, which has the anode terminal connected to the first input terminal 18, and the cathode terminal connected to a common node 19, which is connected, in turn, by means of a resistor 35 to the reference terminal. The Zener diode 34 is configured so as to be maintained, in use, reversely biased by the main voltage of the power supply V1 so as to impose a voltage Vc corresponding to the break down voltage Vz of the Zener diode 34 between the common nodes 20 and 19.

According to a possible embodiment shown in FIG. 4, the compensating circuit of the luminous flux decay 9 comprises a resistive network 36 which has a first terminal connected to the collector of the first transistor 29 by means of the common node 21, and a second terminal connected to the common node 19 and comprising the thermistor 15 and a pair of resistors 37 and 38 connected together and to the thermistor and characterizing/defining, in use, together with the latter the compensation function of the luminous flux decay Vref(T).

Figure 5:
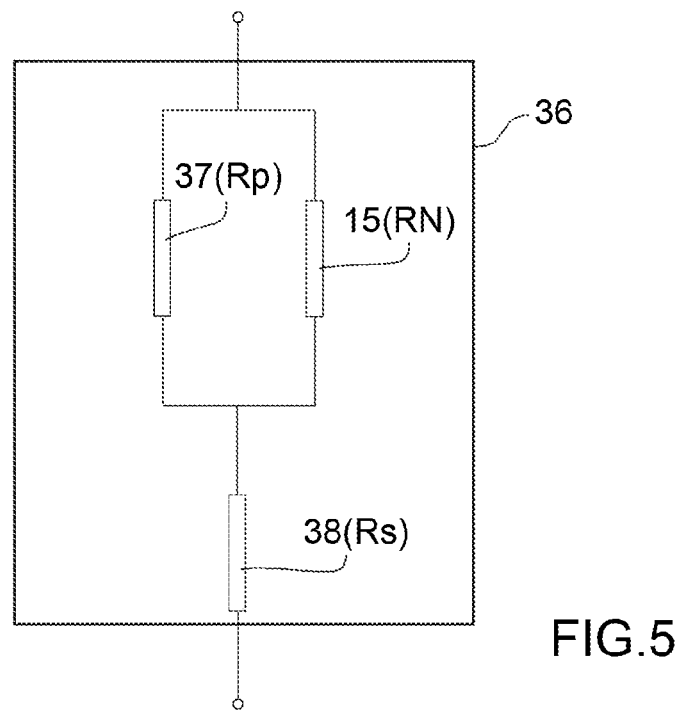
FIGS. 5 and 6 show as many electrical diagrams alternatives of a resistive network found in a luminous decay compensating circuit comprised in the lighting device shown in FIG. 4.

According to a possible embodiment, by way of example, shown in FIG. 5, the thermistor 15 is connected between the first and the second terminal of the resistive network 36, the first resistor 37 is connected in parallel to the thermistor 15, while the second resistor 38 is connected in series to the thermistor 15 and to the first resistor 37.

Figure 6:
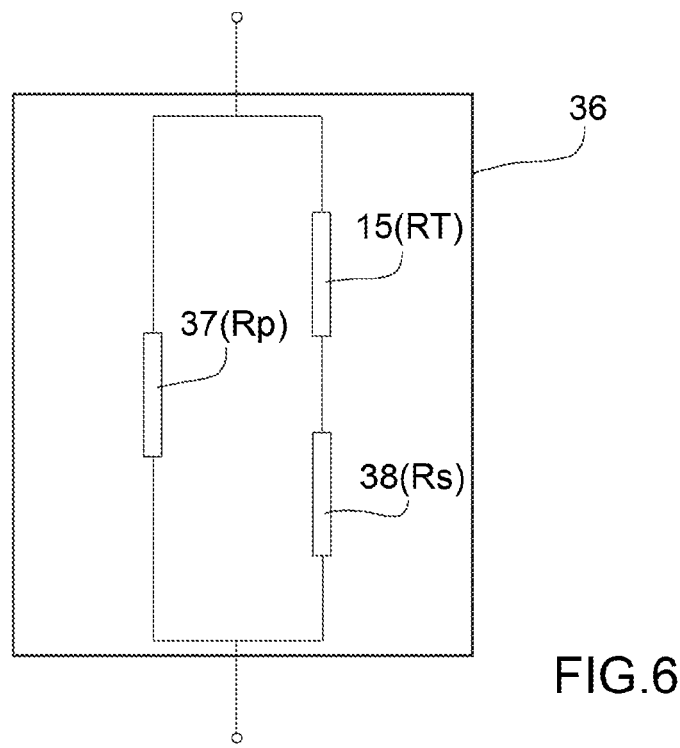

According to a different possible embodiment, by way of example, shown in FIG. 6, the thermistor 15 is connected in series with the second resistor 38 between the first and the second terminal of the resistive network 36, while the first resistor 37 is connected to the first and to the second terminal of the resistive network 36 so as to be arranged in parallel to the thermistor 15 and to the second resistor 38. Subsequently, in order to simplify the understanding of the present invention RT will denote the overall resistance of the resistive network 36.

The operation of the lighting device 4 shown in FIG. 4 will be described below where the thermistor 15 is assumed to be an NTC thermistor.

In use, the temperature increase of the LED 6 determines a reduction of the resistance of the thermistor 15 which determines, in turn, a reduction of the total resistance RT of the resistive network 36. Since the voltage between the common node 19 and the common node 20 has a predetermined, substantially constant value Vc, imposed by the zener diode 34, the reduction of the resistance RT determines an increase of the reference current Iref and thus an increase of the reference electrical quantity Vref. The increase of the reference current/voltage Iref–Vref then causes a resulting increase of the driving current IL according to the above equation a). In particular, an increase of the reference electrical quantity Vref determines: a reduction of the base voltage Vb (T30) of the second transistor 30, an amplification of the current traversing the resistor 32, an increase of the control signal CS and consequently an increase in the driving current IL.

More in detail in the circuit shown in FIG. 4, the following equations are valid:

$$Vref=V1-Vb(T30)+Vbe(T30) \qquad b)$$

$$Vb(T30)=V1-((Vz-Vbe(T30)/Rref+RT))*Rref-Vbe(T30) \quad \text{c)}$$

$$Vref=(Vz-Vbe(T30)/Rref+RT))*Rref \quad \text{d)}$$

$$Vz-Vbe(T30)=\text{constant} \quad \text{e)}$$

neglecting the emitter current of the transistor T31 it is found that $$IL=Vbin/Rbin \quad \text{f)}$$

As Vbe (T30)=Vbe(T31) therefore it is found that Vref=Vbin and therefore:

$$IL=Vref(T)/Rbin=(Vcost/Rref+RT(T)))*Rref$$

From the last equation it is therefore evident that a temperature T increase of the LED 6 causes: a reduction of the resistance RT, an increase of the driving current IL and a consequent increase of the luminous flux generated by the LED 6.

In particular, the driving current IL varies as a function of the temperature T on the basis of the compensation function Vref(T), which depends essentially on RN and on the resistances Rs and Rp. In other words, the resistances Rp of the first resistor 37 and Rs of the second resistor 38 of the resistive network 36 of the resistive conditioning stage 14 characterize/condition suitably the compensation function of the luminous flux decay Vref(T) used to generate the reference electrical quantity Vref in response to a change in the temperature T, and to obtain the luminous flux.

Figure 7:
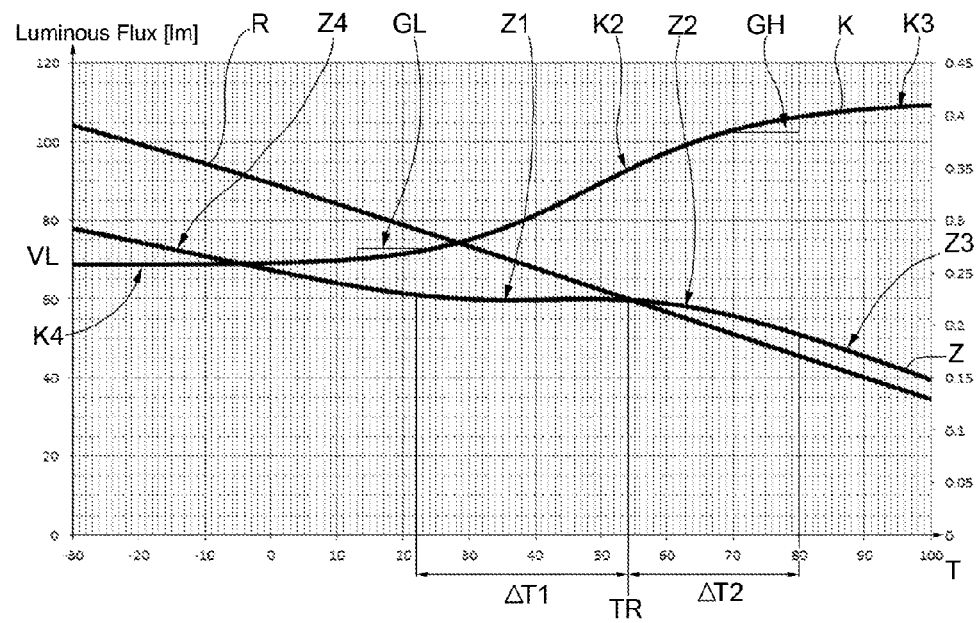
FIG. 7 relates to a graph illustrating an example of a compensation function implemented by the luminous decay compensating circuit shown in FIG. 4 and the corresponding pattern of the luminous flux generated by the lighting device in response to change in the temperature, due to the implementation of the compensation function itself.

FIG. 7 discloses a series of graphs associated with the operation of the lighting device 4 in response to a change in the junction temperature T of the LED 6, wherein the Line K graphically represents a possible compensation function Vref(T), the line Z indicates the pattern of the luminous flux obtained by the control method described above on the basis of the compensation function Vref(T), while the line R represents a reference line indicating a pattern of the luminous flux in the absence of the luminous decay compensation, i.e. obtained by a known control method wherein there is no luminous decay compensation.

In the example of FIG. 7, the pattern Z of the flux obtained by the lighting device 4 has: a section Z1 associated with a temperature range ΔT1 comprising temperatures lower than a predetermined steady state temperature TR. In the range ΔT1, the LED 6 is controlled so as to generate a stabilized flux at a predetermined value. Comparing the pattern Z1 with the pattern R of the non-compensated flux, it is clear that in the temperature range ΔT1, the luminous flux is suitably decremented/attenuated so as to be stabilized to a predetermined value, in order to avoid flux excess at "low temperature" during the LED preheating step.

In the example of FIG. 7, the pattern Z of the flux also has a section Z2 associated with a temperature range ΔT2 comprising higher temperatures than the steady state temperature TR, during which the LED 6 is controlled so as to compensate for the "high temperature" luminous decay following the preheating. Comparing the pattern of the flux in the section Z2 with the line R relating to a non-compensated flux, it is clear that in the temperature range ΔT2, the luminous decay is attenuated until reaching a maximum attenuation at the LED junction temperature.

In the example of FIG. 7, the pattern Z of the flux also presents a section Z3 associated to temperatures above the temperature TH corresponding to the upper end of the range ΔT2, during which the luminous flux compensation is gradually reduced as the temperature T increases. By comparing the pattern of the flux in the section Z3 with the line R relating to a non-compensated flux, it is evident that for temperatures above the temperature TH, the attenuation of the luminous decay is progressively reduced.

In the example of FIG. 7, the pattern Z of the flux also has a section Z4 associated to temperatures lower than a temperature TL corresponding to the lower end of the temperature range ΔT1, during which the attenuation performed on the luminous flux is progressively reduced as the temperature T decreases.

In the example of FIG. 7, the sections Z1, Z2, Z3 and Z4 are obtained on the basis of the corresponding sections K1, K2, K3 and K4 of the compensation function Vref(T), wherein K1 and K2 represent the pattern of the compensation function Vref(T) in the ranges ΔT1 and ΔT2 respectively. K3 represents, instead, the pattern of the compensation function Vref(T) for temperatures greater than TH. For this purpose in the compensation function Vref(T) a turn-over adjustment GH may be set at the temperature TH to make sure that with the increase of temperature T, the function Vref(T) would follow in a substantially asymptotic way a maximum voltage threshold VH determined in the manner described in detail below.

K4 represents, instead, the pattern of the compensation function Vref(T) for temperatures lower than TL. For this purpose in the compensation function Vref(T) a turn-over adjustment GL may be set at the temperature TL so that, with the decrease of temperature T, the voltage Vref would follow in a substantially asymptotic way a minimum threshold VL determined in the manner described in detail below.

The sections K1, K2, K3 which compose the compensation function Vref(T) associated with the luminous flux to be generated can be conveniently set/fixed/calibrated by means of the resistors Rp and Rs in the resistive conditioning stage 14. In this regard, it should be noted that the resistances Rs and Rp defining the compensation function Vref(T) can be calibrated/determined in the design step by means of, for example, programs for simulating the circuit operation known and therefore not described, through which it is possible to establish the resistances Rs and Rp as a function of the required luminous flux that the LED 6 must generate at different temperatures T.

The circuit configuration described above allows to selectively model/shape the pattern of the compensation function Vref(T) in the sections K4-K1 and K2-K3 on the basis of the resistances Rs and Rp respectively. Since the variation of the sections K4-K2-K1 and k3 determines a consequent variation of the sections Z1-Z4 and Z2-z3 respectively of the luminous flux, it is clear that the latter can be modeled/shaped on the basis of the resistors Rs and Rp respectively.

The resistance Rp allows, also, to suitably determine the minimum voltage reference threshold VL associated to the section K4 obtainable by way of the compensation function Vref(T) while the resistance Rs allows to suitably establish/fix the threshold of the maximum reference voltage VH associated with the section K3. In particular with reference to the resistive network 36 shown in FIG. 5, the following equations are valid:
at low temperatures the resistance of the thermistor RNTC tends to an infinite value, therefore:
VL=Vconst*(Rref/(Rp+Rs+Rref)); where it is found that the Rp adjustment allows to limit the minimum electrical quantity reference threshold VL of the section K4
at high temperature the resistance of the thermistor RNTC tends towards zero, therefore,
VH=Vconst*(Rref/(Rs+Rref)) where it is found that the Rs adjustment allows to limit the maximum electrical quantity reference threshold VH of the section K3.

While with reference to the resistive network 36 shown in FIG. 6, the following equations are valid:

at low temperatures RNTC tends towards an infinite value, therefore:

VL=Vconst*(Rref/(Rp+Rref)); wherein it is observed that the Rp adjustment allows to limit the minimum voltage reference threshold of the section K4 at high temperatures the resistance RNTC tends to zero, therefore,

VH=Vconst*(Rref/(Rs+Rp/Rref)) wherein it is noted that the Rs adjustment allows to limit the maximum voltage reference threshold of the section K3.

The Applicant has also found that the resistance adjustment Rbin in the power supply circuit described above allows to suitably shift the inflection of the compensation function Vref(T) centered in the steady state temperature TR. In this way it is advantageously possible to move at will the stabilized section Z1 of the flux along the ordinate axis.

From the above description it is therefore evident that the resistors 37 and 38 of the resistive network 36 characterize the compensation function Vref(T) used by the circuit to compensate for the luminous decay 9. In other words, the resistances Rs and Rp allow to selectively and predominantly modify the sections K4-K1 and K2-K3 of the compensation function Vref(T) so as to obtain the adjustment of the sections Z4-Z1 and Z2-Z3 of the luminous flux. By way of example in FIG. 8 a graph relating to a first test performed through a circuit simulation of the operation of the lighting device 4 described above is shown. The graph shows a series of patterns of the luminous flux generated by the LED 6 under the control of the feeding device 7 in response to a change in the temperature T, wherein each flux pattern is associated with a respective resistance value Rp, while FIG. 9 shows a series of patterns of the luminous flux generated by the LED 6 in response to a change in temperature T, wherein each pattern of the luminous flux is associated with a respective resistance value Rs.

Figure 8:
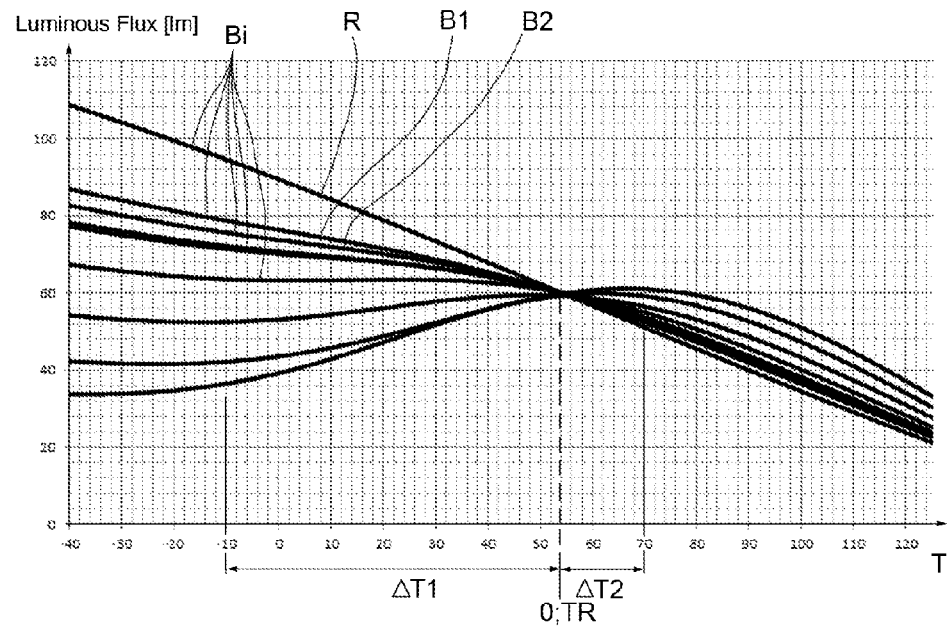
FIGS. 8 and 9 are related to other graphs which illustrate a series of luminous flux patterns in response to a change in the temperature, wherein different patterns are obtained by varying a resistance of a first and respectively of a second resistor included in the resistive network within the luminous decay compensating circuit shown in FIG. 4.
Figure 9:
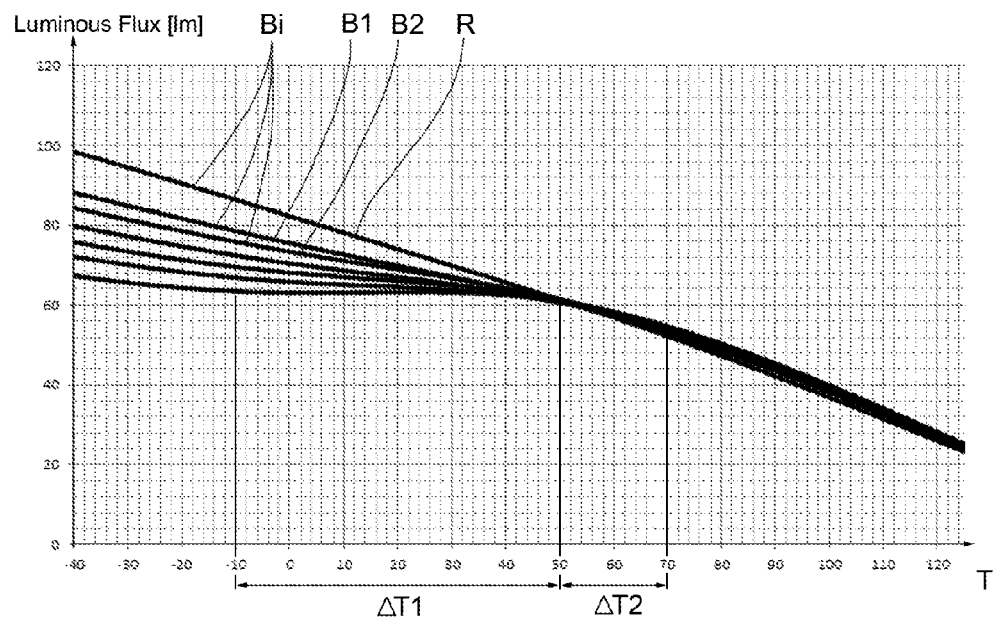

In particular, in FIGS. 8 and 9, the rectilinear line R indicates, similarly to FIG. 7, the pattern of the luminous flux obtained when there is no condition of flux compensation, while the lines Bi (B1, B2, . . . Bi) represent the patterns of the luminous flux generated by the LED 6 in the condition indicated above. The curves representing the different patterns of the flux obtained from the simulation have a common intersection point O with the rectilinear line R i.e. a common reverse curve, at the steady state temperature TR. The point O divides each curve into two portions, wherein a first portion (shown in FIG. 8 to the left of the inflection point O) represents the luminous flux pattern when the temperature is lower than the steady state temperature TR, and a second portion (shown in FIG. 8 to the right of point O) represents the luminous flux pattern when the temperature is higher than the steady state temperature TR.

With reference to FIGS. 8 and 9, the Applicant has found that it is possible to selectively compensate the flux decay at temperatures lower and higher respectively than the steady state temperature TR by varying the resistance Rp and the resistance Rs, respectively. In other words from FIGS. 8 and 9 it is evident that, the adjustment of the resistance Rp and Rs allows compensating selectively (i.e. in a manner substantially independent) the luminous flux at temperatures lower and higher respectively than the steady state temperature TR. This selective calibration of the resistances Rp and Rs conveniently allows to reduce the luminous flux in a controlled manner in particular in the first temperature range ΔT1 and/or increase in a controlled way the luminous flux in particular in the second temperature range ΔT2.

Figure 11:
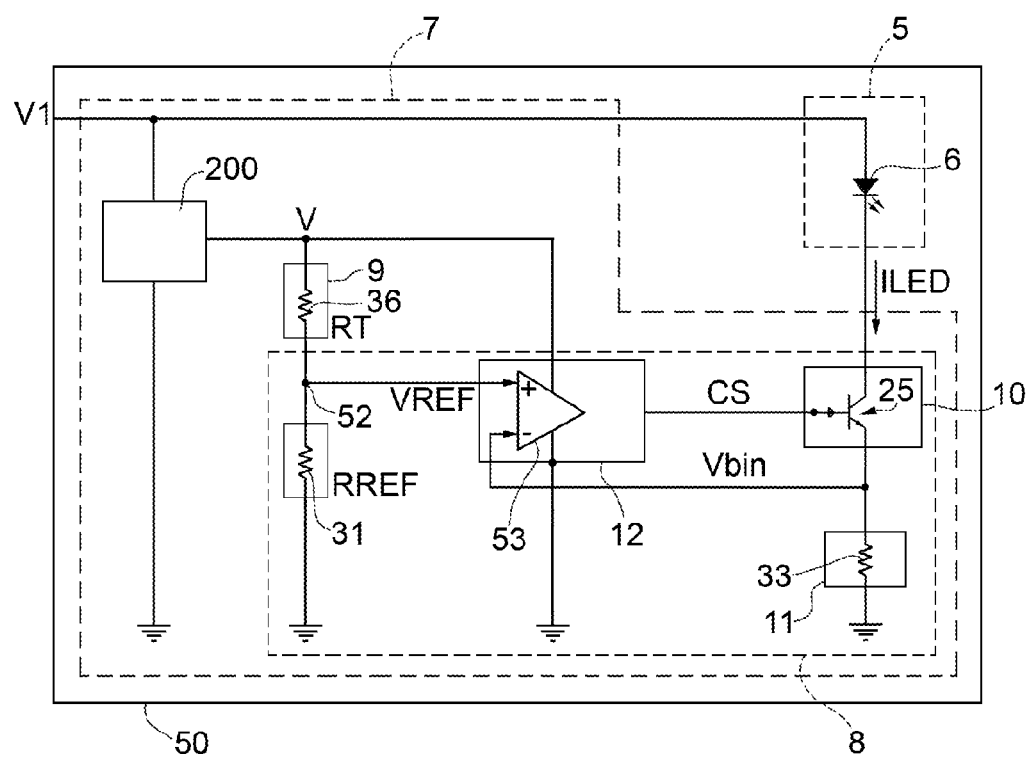
FIG. 11 shows a wiring diagram of a lighting device made according to a second possible embodiment.

FIG. 11 shows schematically a second embodiment of a lighting device 50, which is similar to the lighting device 4, and whose component parts will be identified, where possible, with the same reference numbers that distinguish corresponding components/parts of the lighting device 4.

In the lighting device 50, the driving stage 10 comprises the transistor 25 having its collector connected to the second terminal of the lighting circuit 6; the stage current sensor 11 comprises the resistor 33 connected between the emitter of the transistor 25 and the reference terminal set at the reference potential, preferably the ground potential; the compensation function resistive conditioning stage 14 comprises the resistive network 36 having a terminal connected to an output line of a voltage regulator block 200 set at the constant voltage Vc; the current controlling stage 12 comprises an operational amplifier 53 having non-inverting input connected to a common node 52 of connection between the second terminal of the resistive network 36 and a terminal of the resistor 31 in turn connected with the other terminal to the reference terminal. The operational amplifier 53 also has the inverting terminal connected to the collector of transistor 25 for receiving the sensed voltage Vbin, and an output terminal connected to the base of transistor 25 to provide the same with the control signal CS.

The operation of the lighting device 50 shown in FIG. 11 will be hereinafter described. An increase in the temperature T of the LED 6 determines: a reduction of the resistance of the NTC thermistor 15, an increase of the current Iref as the voltage Vconst on the voltage divider formed by RT and Ref remains constant; and an increase of the reference electrical quantity Vref on the non-inverting terminal of the operational amplifier. The operational amplifier 53 allows to increase the control signal CS on the basis of the increase of the difference between the reference electrical quantity Vref and the sensed voltage Vbin. The increase of the control signal CS supplied to the transistor 25 causes an increase of the driving current IL of the LED 6.

From the above description it should be specified that the compensation function Vref(T) in this case is determined/ established by means of appropriate adjustment of the resistances Rs and Rp of the resistors 37 and 38 of the resistive network 36.

The power supply circuit found in the automotive lamp described above advantageously allows to obtain by means of the adjustment of the resistances Rp and Rs of the resistive conditioning stage, both a negative compensation controlled by the flux in the LED preheating step so as to limit the flux to a predetermined value and keep it stable during the preheating step itself also when the environment temperature is relatively low, and positive controlled compensation of the flux following the LED preheating step so as to limit the flux decay at high temperatures. In particular, by suitably sizing the resistances Rs and Rp it is possible to define the range of temperatures within which the luminous flux remains stable at a predetermined value.

Figure 10:
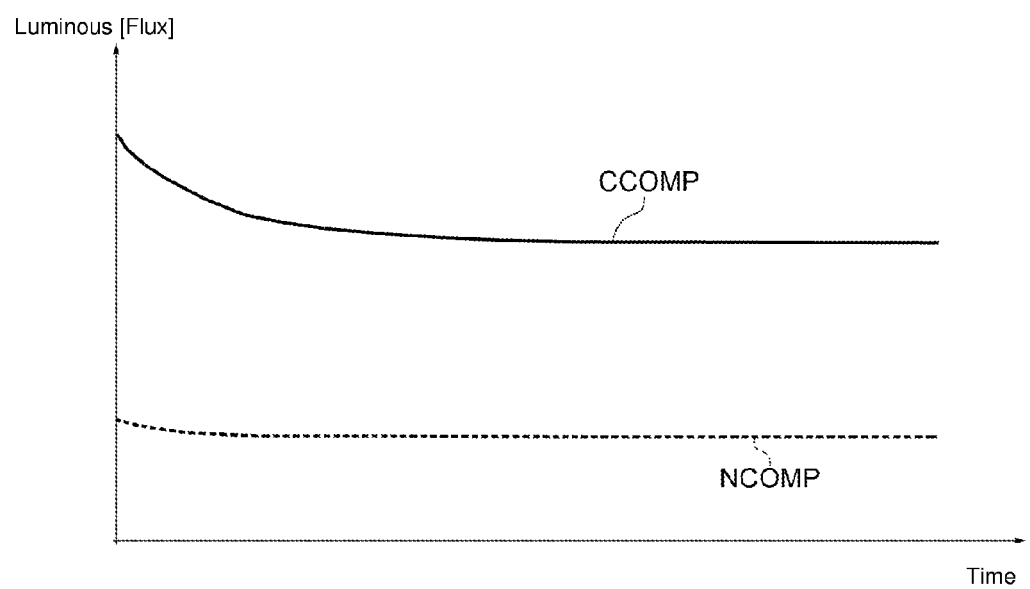

In order to highlight the improvement achieved by the present invention in FIG. 10 a graph can be found obtained by the Applicant by way of tests wherein the line NCOMP represents the time course of the luminous flux in a lamp with no compensation, while the line CCOMP represents the time course of the luminous flux obtained by the compensation performed by the power supply circuit 7 described above. The fact is highlighted that the average luminous decay of the luminous flux in time represented by line NCOMP is equal to 14.2% of the total flux emitted, while the average luminous decay of the luminous flux in time represented by line CCOPM is equal to 4.5%.

Finally it is clear that the automotive lighting device, and the automotive lamp described above can be modified and varied without departing from the scope of the present invention defined by the appended claims.

The invention claimed is:

1. An automotive lamp (1) comprising a lighting device (4) which comprises:
 a lighting circuit (5) which is provided with at least one LED (6) and is designed to generate a luminous flux on the basis of a driving current (IL); and
 a power supply circuit (7), which is designed to provide said driving current (IL) to said lighting circuit (5) and comprises:
  a current controlling electrical circuit (8), which is designed to receive a reference electrical quantity (Vref), and a sensed electrical quantity (Vbin) indicative of the driving current (IL) and is configured to provide the electrical driving current to the LED (5) on the basis of said reference electrical quantity (Vref) and of said sensed electrical quantity (Vbin);
  a luminous flux decay compensating electrical circuit (9), which is configured so to provide said reference electrical quantity (Vref) to said current controlling electrical circuit (8) and to vary said reference electrical quantity (Vref) by way of a compensation function of the luminous flux (Vref(T)) predetermined on the basis of the temperature (T) of the LED (6);
 wherein said current controlling electrical circuit (8) comprises: a driving stage (10) configured to regulate/adjust the driving current (IL) on the basis of a control signal (CS); a current sensing stage (11) which provides said sensed electrical quantity (Vbin) based on the driving current (IL); and a current control stage (12) configured so as to: receive the sensed electrical quantity (Vbin), receive the reference electrical quantity (Vref), and provide the control signal (CS) to the driving stage (10) on the basis of a value indicative of the difference between the reference electrical quantity (Vref) and said sensed electrical quantity (Vbin);
 wherein said current controlling stage (12) comprises a pair of transistors (29) (30) connected together with a respective first common terminal so as to form a current mirror; a first transistor (29) presenting a second terminal connected to a first terminal of said luminous flux decay compensating electrical circuit (9); a second transistor (30) having a second terminal connected to a terminal of said driving stage (10) receiving said control signal (CS);
 said automotive lamp (1) being characterized in that said luminous flux decay compensating electrical circuit (9) comprises:
  temperature dependent sensing electrical means (15) thermally coupled/connected to said LED (6) to provide an electrical signal indicative of the temperature (T) of the LED (6); and
  resistive conditioning electrical means (37) (38) which are configured so as to condition said compensation function of the luminous flux (Vref(T)) in a prefixed mode in order to cause the reference quantity (Vref), obtained by the conditioned compensation function of the luminous flux (Vref (T)), to vary in a predetermined way in response to a change in the temperature (T) of said LED (6).

2. The automotive lamp according to claim 1, wherein said temperature dependent sensing electrical means (15) comprise thermistor means NTC or PTC (15), and said resistive conditioning electrical means (37) (38) comprise first (37) and second (38) resistor means which are connected to the thermistor means NTC or PTC (15) and comprise a first (Rp) and respectively a second (Rs) electrical resistance.

3. The automotive lamp according to claim 2, wherein said first (Rp) and second (Rs) electrical resistance selectively condition the compensation function of the luminous flux (Vref (T)) substantially in a first temperature range (ΔT1) lower than a predetermined operating temperature (TR) of LED (6), and respectively, in a second temperature range (ΔT2) higher than said predetermined operating temperature (TR).

4. The automotive lamp, according to claim 2, wherein said first (37) and second (38) resistor means are connected in parallel and in series respectively to said thermistors means NTC or PTC (15).

5. The automotive lamp according to claim 1, wherein said current sensing stage (11) comprises a sensing resistor (33), which, in use, is crossed by said driving current (IL) to generate said sensed electrical quantity (Vbin); said first transistor (29) having a third terminal connected to a first terminal of said sensing resistor (33), by way of a reference resistor (31); said second transistor (30) having a third terminal connected to a second terminal of said sensing resistor (33); said reference resistor (31) being designed to be crossed, in use, by a reference current (Iref) to generate said reference electrical quantity (Vref).

6. The automotive lamp according to claim 5, comprising voltage stabilizing means (34) designed to maintain a predetermined stabilized voltage between the first terminal of said reference resistor (31) connected to the first terminal of said sensing resistor (33), and a second terminal of said luminous flux decay compensating electrical circuit (9).

7. The automotive lamp according to claim 1, wherein said current controlling stage (12) comprises a operational amplifier (53) having a non-inverting input terminal receiving said reference electrical quantity (Vref), an inverting input terminal receiving said sensed quantity (Vbin), an output terminal providing said control signal (CS) determined on the basis of an indicative value of the difference between said reference electrical quantity (Vref) and said sensed quantity (Vbin).

8. The automotive lamp according to claim 7, wherein said luminous flux decay compensating electrical circuit (9) has a first terminal receiving a predetermined constant voltage (Vconst), a second terminal connected to said non-inverting input terminal and a reference terminal, by way of a reference resistor (31) which in use is crossed by a reference current (Iref) generating said reference electrical quantity (Vref).

9. The automotive lamp according to claim 8, wherein said current sensing stage (11) comprises a sensing resistor (33), said driving stage (10) comprising a driving transistor (25) comprising a first terminal receiving said control signal (CS) a second terminal connected to a terminal of said lighting circuit (5) and a third terminal connected to said inverting terminal and to said sensing resistor (26).

10. An automotive lamp (1) comprising a lighting device (4) which comprises:
 a lighting circuit (5) which is provided with at least one LED (6) and is designed to generate a luminous flux on the basis of a driving current (IL); and a power supply circuit (7), which is designed to provide said driving current (IL) to said lighting circuit (5) and comprises:
  a current controlling electrical circuit (8), which is designed to receive a reference electrical quantity (Vref), and a sensed electrical quantity (Vbin) indicative of the driving current (IL) and is configured to provide the electrical driving current to the LED (5) on the basis of said reference electrical quantity (Vref) and of said sensed electrical quantity (Vbin);
  a luminous flux decay compensating electrical circuit (9), which is configured so to provide said reference electrical quantity (Vref) to said current controlling electrical circuit (8) and to vary said reference electrical quantity (Vref) by way of a compensation function of the luminous flux (Vref(T)) predetermined on the basis of the temperature (T) of the LED (6);
  wherein said current controlling electrical circuit (8) comprises: a driving stage (10) configured to regulate/adjust the driving current (IL) on the basis of a control signal (CS); and a current control stage (12) configured so as to provide the control signal (CS) to the driving stage (10);
  wherein said current controlling stage (12) comprises a pair of transistors (29) (30) connected together with a respective first common terminal so as to form a current mirror; a first transistor (29) presenting a second terminal connected to a first terminal of said luminous flux decay compensating electrical circuit (9); a second transistor (30) having a second terminal connected to a terminal of said driving stage (10) receiving said control signal (CS);

said automotive lamp (1) being characterized in that said luminous flux decay compensating electrical circuit (9) comprises:
  temperature dependent sensing electrical means (15) thermally coupled/connected to said LED (6) to provide an electrical signal indicative of the temperature (T) of the LED (6); and
  resistive conditioning electrical means (37) (38) which are configured so as to condition said compensation function of the luminous flux (Vref(T)) in a prefixed mode in order to cause the reference quantity (Vref), obtained by the conditioned compensation function of the luminous flux (Vref (T)), to vary in a predetermined way in response to a change in the temperature (T) of said LED (6).

11. The automotive lamp according to claim 10, wherein said temperature dependent sensing electrical means (15) comprise thermistor means NTC or PTC (15), and said resistive conditioning electrical means (37) (38) comprise first (37) and second (38) resistor means which are connected to the thermistor means NTC or PTC (15) and comprise a first (Rp) and respectively a second (Rs) electrical resistance.

12. The automotive lamp according to claim 11, wherein said first (Rp) and second (Rs) electrical resistance selectively condition the compensation function of the luminous flux (Vref (T)) substantially in a first temperature range (ΔT1) lower than a predetermined operating temperature (TR) of LED (6), and respectively, in a second temperature range (ΔT2) higher than said predetermined operating temperature (TR).

13. The automotive lamp, according to claim 11, wherein said first (37) and second (38) resistor means are connected in parallel and in series respectively to said thermistors means NTC or PTC (15).

* * * * *